(12) United States Patent
Valerio

(10) Patent No.: US 11,130,141 B2
(45) Date of Patent: Sep. 28, 2021

(54) SYSTEM AND METHOD FOR RECOVERING GLASS AND METAL FROM A MIXED WASTE STREAM

(71) Applicant: Thomas A Valerio, Atlanta, GA (US)

(72) Inventor: Thomas A Valerio, Atlanta, GA (US)

(73) Assignee: TAV HOLDINGS, INC., Atlanta, GA (US)

( * ) Notice: Subject to any disclaimer, the term of this patent is extended or adjusted under 35 U.S.C. 154(b) by 94 days.

(21) Appl. No.: 16/327,313

(22) PCT Filed: Aug. 21, 2017

(86) PCT No.: PCT/US2017/047862
§ 371 (c)(1),
(2) Date: Feb. 21, 2019

(87) PCT Pub. No.: WO2018/039146
PCT Pub. Date: Mar. 1, 2018

(65) Prior Publication Data
US 2019/0176163 A1    Jun. 13, 2019

Related U.S. Application Data

(60) Provisional application No. 62/377,627, filed on Aug. 21, 2016.

(51) Int. Cl.
| | |
|---|---|
| *B03B 9/06* | (2006.01) |
| *B03B 5/10* | (2006.01) |
| *B03C 1/18* | (2006.01) |
| *B03B 5/62* | (2006.01) |
| *B03C 1/025* | (2006.01) |
| *B03C 1/23* | (2006.01) |

(52) U.S. Cl.
CPC .............. *B03B 9/06* (2013.01); *B03B 5/10* (2013.01); *B03B 5/623* (2013.01); *B03C 1/025* (2013.01); *B03C 1/18* (2013.01); *B03C 1/23* (2013.01); *B03C 2201/20* (2013.01); *Y02W 30/52* (2015.05)

(58) Field of Classification Search
CPC .. B03B 9/06; B03B 9/062; B03B 5/10; B03B 5/62; B03B 5/623; Y02W 30/52
USPC .......................................................... 209/39
See application file for complete search history.

(56) References Cited

U.S. PATENT DOCUMENTS

| | | | | |
|---|---|---|---|---|
| 3,945,575 A | * | 3/1976 | Marsh ....................... | B03B 9/06 241/20 |
| 4,155,838 A | * | 5/1979 | Basten ....................... | B03B 9/00 209/172.5 |
| 5,950,936 A | * | 9/1999 | Bergart ..................... | B03B 5/56 241/21 |
| 6,024,226 A | * | 2/2000 | Olivier .................... | B03B 9/061 209/172.5 |
| 8,684,288 B2 | * | 4/2014 | Gitschel ................. | B03C 1/247 241/19 |

(Continued)

FOREIGN PATENT DOCUMENTS

WO    WO-2018039146 A1 *   3/2018   ............. B03B 5/623

*Primary Examiner* — Terrell H Matthews
(74) *Attorney, Agent, or Firm* — Greenberg Traurig LLP

(57) ABSTRACT

Devices, systems, and methods for separating waste stream with high glass concentrations to recover desired materials are described. The devices, systems, and methods may include a wet separator, a multi-stage screen(s), shredder(s), rising velocity separator(s)/jig(s), magnetic pulley(s), eddy current separator(s), and/or optical sorters.

32 Claims, 5 Drawing Sheets

(56) References Cited

U.S. PATENT DOCUMENTS

RE45,290 E * 12/2014 Andela .................. B03B 9/062
  241/14
2009/0283018 A1* 11/2009 Grasso, Jr. ............. B02C 17/22
  106/709

* cited by examiner

SYSTEM AND METHOD FOR RECOVERING GLASS AND METAL FROM A MIXED WASTE STREAM

TECHNICAL FIELD

This disclosure generally relates to separation techniques. More particularly, this disclosure relates to methods and systems for recovering materials from mixed waste streams or waste streams (having glass and metals) to produce clean metal and glass commodities.

BACKGROUND

Around the world, attention is paid to the adverse environmental effects of landfilling waste. Proper landfilling of waste requires large areas of land, which may be in limited supply in certain urban areas. The waste also may pose adverse environmental effects, including effects to water tables underlying disposal sites, due to contamination from chemicals and heavy metals contained in the waste.

Recovery of these valuable resources has been instituted in various waste streams. For example, at the end of its useful life, household waste is either disposed altogether or sorted by type such as paper/cardboard, metals, plastics and glass. In many cases, although the waste has been pre-sorted at home for recycling, such as a glass concentrate, it may still contain a number of different recyclables mixed with the concentrate such as paper, metals, plastics, organic food waste and others.

Such commingled waste represents a challenge to properly sort the different recyclables into a commodity that can be further processed for re-use. In addition, conventional sorting techniques known to the art such as air density separation systems present challenges when processing a glass concentrate, making it difficult for dust control as well as presenting limitations to the efficiency for sorting metals (such as stainless steel), plastics, and organics from the glass concentrate. There is always a need for improved systems and methods to recover materials from waste streams.

SUMMARY

One aspect includes a system for recovering desired materials from a mixed waste stream having a waste stream having glass, a feeder configured to receive the waste stream, and a wet separator operating at about 1.6 SG (specific gravity) to 2.4 SG that separates the waste stream into a first portion and a second portion. A dewatering device configured to remove water from the second portion. The second portion having a specific gravity over the operating specific gravity of the wet separator and including the glass concentrate.

Another aspect includes a wet process for recovering glass from a mixed waste stream comprising providing the mixed waste stream having the glass, separating the waste stream using a rising current separator operating at between 1.8 and 2.4 SG, wherein there is a first heavy fraction and a first light fraction, and dewatering the first heavy fraction. The heavier/higher specific gravity fraction includes the glass concentrate.

This disclosure generally provides devices, systems, and methods for separating a glass waste stream or a mixed waste stream to recover desired materials and produce clean glass concentrate and metal products. The devices, systems, and methods may include multi-stage screen(s), shredder(s), rising current separator(s)/jig(s), magnetic pulley(s), eddy current separator(s), and optical sorters, particularly for glass and metallics.

BRIEF DESCRIPTION OF THE DRAWINGS

This disclosure is illustrated in the figures of the accompanying drawings which are meant to be illustrative and not limiting, in which like references are intended to refer to like or corresponding parts, and in which.

DETAILED DESCRIPTION

Detailed embodiments of the systems and methods are disclosed herein. However, it is to be understood that the disclosed embodiments are merely illustrative of the systems, devices, and methods, which may be embodied in various forms. Therefore, specific functional details disclosed herein are not to be interpreted as limiting but merely as a basis for the claims and as a representative basis for teaching one skilled in the art to variously employ the systems, devices, and methods disclosed herein.

Generally, this disclosure relates to systems and methods for recovering desired materials from a mixed waste stream or a waste stream composed of mainly glass waste but heavily contaminated with other waste, including but not limited to, municipal glass waste concentrate. In another embodiment, the system for recovering desired materials (e.g., glass) from a mixed waste stream has a waste stream having glass, a feeder configured to receive the waste stream, a first rising current separator operating at about 1.6 specific gravity ("SG") to 2.4 SG, wherein the separator divides the waste stream or material into a first portion and a second portion. The waste stream or portion greater than the operational specific gravity of the first rising current separator can be further processed, e.g., by a dewatering device configured to remove water from the second portion. In a fundamental or basic configuration or embodiment, a wet separator (e.g., a first rising current separator) can be used to separate the glass concentrate from the waste stream. For example, glass concentrate can be recovered from a municipal waste stream containing glass.

In another embodiment, the system for recovering desired materials (e.g., glass) from a mixed waste stream has a waste stream having glass, a feeder (such as a creep feeder) configured to receive the waste stream, and a wet separator, e.g, a first rising current separator, operating at about 1.6 SG to 2.4 SG and configured to divide the waste stream or material into a first portion and a second portion. This embodiment also includes a dewatering device configured to remove water from the second portion, a magnetic pully configured to remove ferrous metals from the second portion after the dewatering device, and an eddy current separator configured to remove additional metals from the second portion. In certain embodiments, there can be one or more dewatering devices.

The systems and methods can have or optionally include multi-stage screen(s) (including, e.g., a rotating drum, a wet screen, or a vibrating screen), shredder(s), rising velocity separator(s)/jig(s), magnetic pulley(s), eddy current separator(s), and/or optical sorters. In some examples, the process can recover 95% of the glass from a waste stream containing between about 10% to about 90% glass.

Figure 1A:
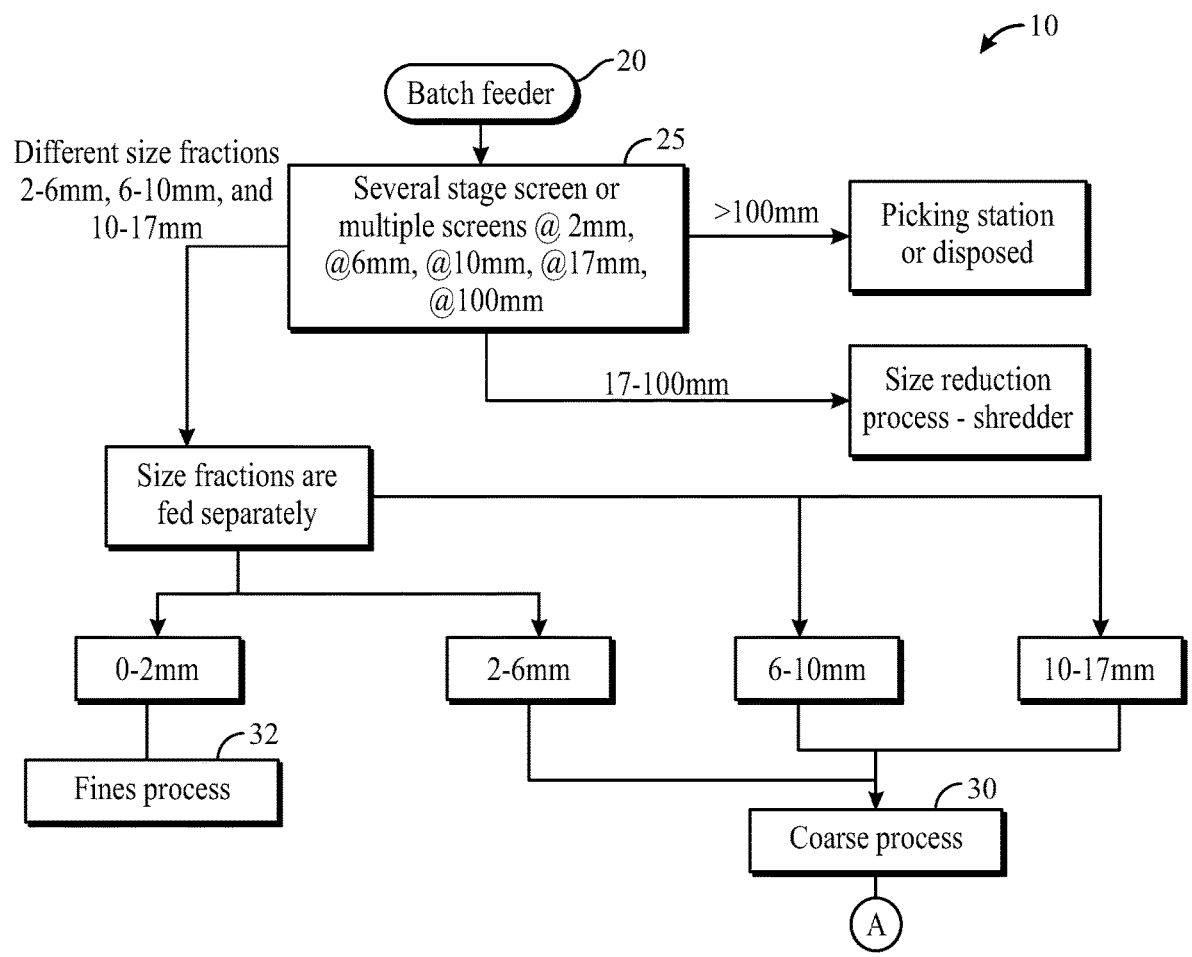
FIG. 1A shows a former part of an exemplary flow diagram for a process to treat mixed waste, or heavily glass concentrate having waste.
Figure 1B:
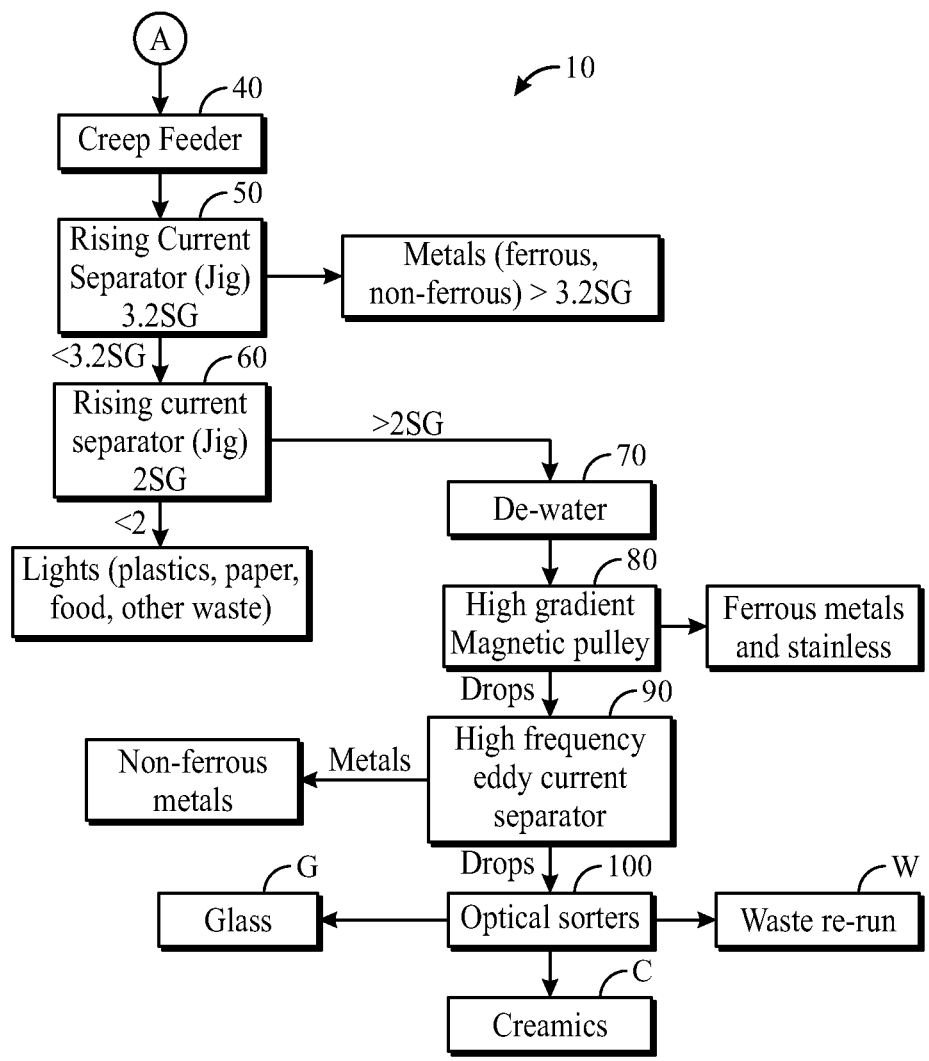
FIG. 1B shows a latter part of an exemplary flow diagram for processes to treat mixed waste or heavily glass concentrate having waste.

FIGS. 1A and 1B (which can be read together with FIG. 3) illustrate an exemplary method 10 and system 200 for separating glass concentrate from a waste stream. As shown in FIG. 1A, one embodiment includes batch feeder 20 that dispenses glass concentrate or other similar mixed waste containing various sizes of materials into a multi-stage screen 25. The multi-stage screen 25 has a screen that allows materials about 100 millimeters (mm) or less to pass through and a screen that allows materials about 17 mm or less to pass through. The sizing configuration shown in FIG. 1A may be optional, as the system may be configured to receive discretely sized material A. The sizes of the screen may vary, e.g., one screen may be 10 mm and the other screen may be 50 mm. The sizing or screen sizes may be optimized accordingly.

FIG. 1B shows the processing of discretely sized material A flowing to a feeder 40 (e.g. a creep feeder) for further processing. In this embodiment, the material may be separated at about 3.2 SG, according to method 10. Such separation may be carried out by an optional or additional rising current separator (seen at 50 of FIG. 1B and 214 of FIG. 3A) that operates at or about 3.2 SG. Materials having an SG of about 3.2 or greater (i.e., metals such as ferrous, non-ferrous metals, and precious metals) are separated and removed by the method 10. Materials having an SG of about 3.2 or lower can be sent to a first wet separator, e.g., a rising current separator 60 that separates at 2.0 SG to further process the glass concentrate. The falling velocity separators 50, 60 may be a jig or pulsating jib. The falling velocities may operate with water or a fluid with a larger constant specific gravity. Of course, since the additional rising separator 50 (operating at about 3.2 SG) is optional, the first wet separator 60 may directly receive the material from the creep feeder 40.

The materials having (a) an SG of about 3.2 or smaller, still segregated in discrete sizes, or (b) materials from the creep feeder 40 can be further separated at about 1.6 to about 2.4 SG using, e.g., a first rising velocity separator 60. The first rising current separator 60 operates at or about 2 SG or in a range of about 1.6 to about 2.4 or 1.8 to about 2.2. Materials having an SG at about or less than about 2 (i.e., paper, plastics, film, food waste and other waste) are removed by the process 10, which increases the purity of the materials to be further processed.

Materials having an SG of about or greater than 2 are removed from the rising velocity separator 60 for de-watering or a dewatering device 70. As an option, drying may take place via the use of a machine/apparatus, or drying may occur through natural means, such as heat from the sun before further processing the materials having an SG greater than 2.

After de-watering, the materials having an SG of about or greater than 2 undergo a first magnetic separation 80 by, e.g., a high-intensity magnetic pulley 80, where any remaining ferrous metals are separated and removed during this separation. The high-intensity magnetic pulley 80 may provide field strengths of about 2000 gauss and greater.

The remaining non-ferrous materials undergo a second magnetic separation 90, e.g., by high-frequency eddy current separator 90, where non-ferrous metals are separated and removed from the system. An eddy current separator 90 uses a powerful magnetic field to separate non-ferrous metals from waste after all ferrous metals have been removed previously by some arrangement of magnets. For example, the eddy current separator 90 can recover non-ferrous metals such as aluminum, brass and copper.

The resulting drops or materials from the eddy current separator 90 can be subsequently sent to optical sorters 100, if needed. The optical glass sorters are capable of sorting glass based on the transparency or lack of transparency of the material. The color sorting can be exercised in multiple stages to sort the glass material into different color streams. The glass has significant commercial value when properly sorted. Additional stages of optical sorters can be employed to sort other non-metallics such as ceramics. At the optical glass sorter 100 (or 226 of FIG. 3B), the non-metallic composition is separated into a glass portion sorted that is further into different colors and a ceramic concentrate, which are then removed from the system 10. The result of the method/process includes recovered metals, clean glass/glass concentrate products, and ceramics. All three fractions may meet commercial standards and have significant commercial value.

Figure 2:
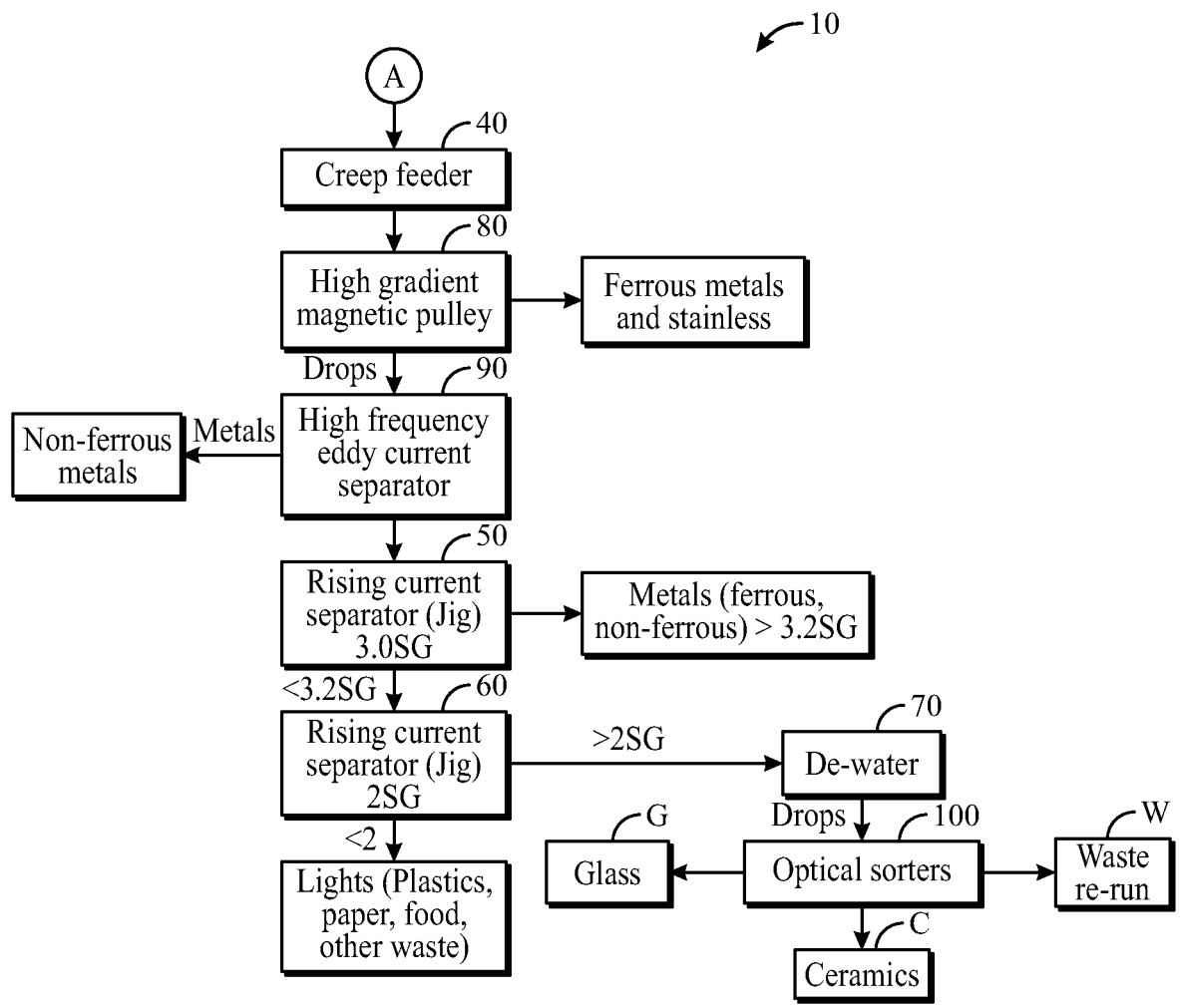
FIG. 2 shows an alternate later part of an exemplary flow diagram for processes to treat mixed waste or heavily glass concentrate having waste.

FIG. 2 shows another exemplary embodiment or method 10 in which (a) the material undergoes de-watering after the rising current separation and before the optical sorting step and (b) ferrous, stainless steel, and non-ferrous metal (e.g., aluminum) material are separated from the material prior to separation using the first and optional rising current separators. For example, after the sizing steps as shown in FIG. 1A, the material (A) travels from a creep feeder 40, to a magnetic pulley 80 where the ferrous metals and stainless materials are removed. Non-ferrous metals are then removed from the drops of the magnetic pulley using a high-frequency eddy current 90. After that material is treated using the first rising current separator 60 at, for example, about 2 SG. The materials less than 2 SG are dewatered and removed from the process. In certain embodiments, an optional or additional rising current separator 50 is employed before the first rising current separator. This optional or additional rising current separator 50 may operate at about 3.2 SG. In embodiments with the optional rising separator, the materials larger than 2 SG but smaller than 3.2 SG are dewatered and processed using an array of optical sorters 100. The result of the method/process includes recovered metals, clean glass concentrate G, ceramics C, and waste W.

FIG. 2 shows the processing of discretely sized material A flowing to a feeder (e.g., a creep feeder) for further processing. In this embodiment, the material may flow to an optional rising current separator 50 that may operate at or about 3.2 specific gravity ("SG"). Materials having an SG about 3.2 or greater (i.e., metals such as ferrous, non-ferrous metals, and precious metals) are separated and removed from the system 10. Materials having an SG about 3.2 or lower can be sent to a rising current separator 60 that separates at 2.0 SG to further process the glass concentrate. The falling velocity separators 50, 60 may be jigs or screw classifier. The falling velocities may operate with water or a fluid with a larger constant specific gravity.

The materials having an SG about 3.2 or smaller, still segregated in discrete sizes, can be processed by the rising velocity separator 60. In one embodiment, the rising current separator 60 operates at or about 2 SG. Materials having an SG of about or less than 2 (i.e., paper, plastics, film, food waste and other waste) are removed from the system 10, which increases the purity of the materials to be further processed. Materials having an SG of about or greater than 2 are removed from the rising velocity separator 60 for de-watering 70. As an option, drying may take place via the use of a machine/apparatus, or drying may occur through natural means, such as heat from the sun before further processing the materials having an SG greater than 2.

After de-watering 70, the materials having an SG of about or greater than 2 are sent to a high-intensity magnetic pulley 80 where any remaining ferrous metals are separated and removed from the system 10. The high-intensity magnetic pulley 80 may provide field strengths of about 2000 gauss and greater. The remaining non-ferrous materials are sent to a high-frequency eddy current separator 90 where non-ferrous metals are separated and removed from the system.

An eddy current separator 90 uses a powerful magnetic field to separate non-ferrous metals from waste after all ferrous metals have been removed previously by some arrangement of magnets. For example, the eddy current separator 90 can recover non-ferrous metals such as aluminum, brass and copper.

The resulting drops from the eddy current separator 90 are subsequently sent to optical sorters 100. Optical glass sorters 100 are capable of sorting glass based on the transparency or lack of transparency of the material. The color sorting can be exercised in multiple stages to sort the glass material into different color streams. The glass has significant commercial value when properly sorted. Additional stages of optical sorters can be employed to sort other non-metallics such as ceramics. At the optical glass sorter 100, the non-metallic composition is separated into a glass portion sorted into different colors as well as a ceramic concentrate, which is then removed from the system 10. The result of the method/process 10 includes recovered metals, clean glass concentrate G, ceramics C and/or waste W. All three fractions may meet commercial standards and have significant commercial value.

Figure 3A:
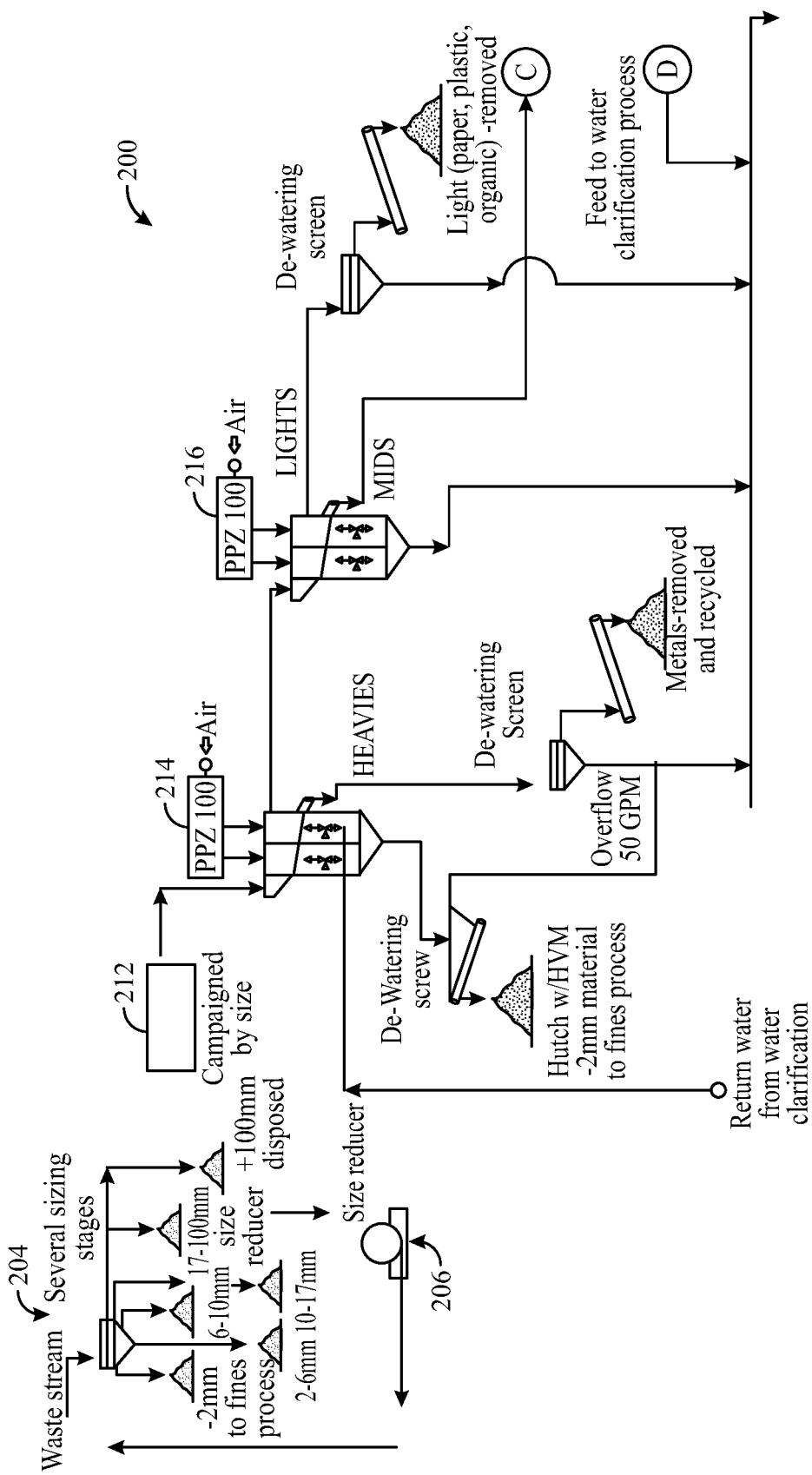
FIG. 3A shows an exemplary flow diagram for processes to treat mixed waste or heavily glass concentrate having waste in accordance with the present disclosure.
Figure 3B:
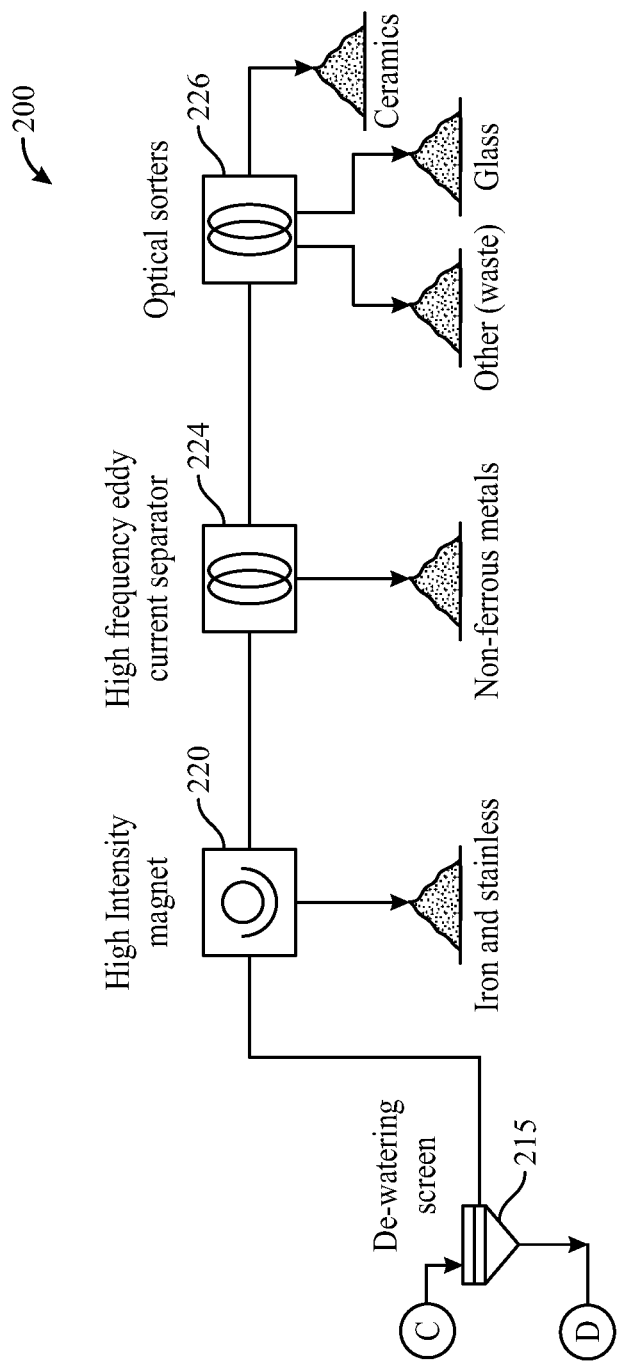
FIG. 3B shows an exemplary flow diagram for a system of processing a mixed waste or heavily glass concentrate that is contaminated with waste in accordance with the present disclosure.

FIGS. 3A and 3B show another exemplary embodiment in which (a) the material undergoes de-watering after the rising current separation and before the optical sorting step and (b) ferrous, stainless steel, and non-ferrous metal (e.g., aluminum) material are separated from the material prior to separation using the optional 214 and first 216 rising current separators. For example, after the sizing steps are shown in FIG. 1A, the material travels from a creep feeder, to a magnetic pulley where the ferrous metals and stainless materials are removed. Non-ferrous metals are then removed from the drops of the magnetic pulley using a high-frequency eddy current. After that material is treated using the optional 214 and first 214 rising current separators at 3.2 and 2 (respectively), the materials less than 2 SG are dewatered and removed from the process. The materials larger than 2 SG but smaller than 3.2 SG are dewatered and processed using an array of optical sorters. The result of the method/process includes recovered metals, clean glass products, and ceramics.

Materials greater than about 100 mm are removed from the system 200 for further manual and/or automatic processing. In this example, materials having a size of about 17 mm to about 100 mm are sent to a size reducer 206, which reduces the about 17 mm to about 100 mm materials into smaller sized materials. The size reducer 206 may be a ball mill, crusher, shredder, pulverizers, vertical impact crusher or like apparatus capable of reducing the size of the materials sent to the size reducer 206. Upon the materials being reduced in size, the materials may be sent back to the multi-stage screen 204 for further separation. Both crushing and grinding lead to size reduction of the material or to "comminution". The comminuted material may be conveyed to a size separator that fractionates the material by size to produce two or more sized waste stream (e.g., at least an over fraction and an under fraction).

In one example, multiple screening devices can be used and are optional. Wet screening can be employed for this step, this involves injecting water through the screening stage. Materials smaller than about 17 mm are further screened to allow materials about 10 mm or less to pass through. The material smaller than 10 mm is further screened to allow materials about 6 mm or less to pass through. Similarly, the material smaller than 6 mm is further screened to allow materials about 2 mm or less to pass through. Materials about 2 mm and smaller are removed from the system 200 for further manual and/or automatic processing, such as fines processing, for example by other methods. This screening step may be performed with or without water, that is, it may be a "wet" screen or a "dry" screen.

The materials can be segregated into discrete size ranges based on, e.g., commercially available equipment and specifications. Exemplary and illustrative size ranges include about 2 to about 6 mm, about 6 to about 10 mm, and about 10 mm to about 17 mm. Materials between about 17 mm to about 100 mm can be shredded further. Materials about 100 mm and greater are removed from the system 100 through manual or automatic processing. An exemplary optimal size ratio upon segregation is about 3:1. Separation of the materials into discrete batch size ranges provides more effective processing at later processing stages of the system 100. More particularly, each fraction can be batched through system 100 to promote efficiency.

The sized or discretely sized materials, e.g., of about 2 mm to about 6 mm, are sent to a creep feeder 212, which transports the materials to a first rising current separator/jig 214. Exemplary rising current separators are able to separate light and heavy particles/materials using their abilities to penetrate an oscillating fluid bed supported on a screen. Examples of such oscillating fluid can be water with a specific gravity of 1.0 or a different type of solution having chemicals, minerals and or magnetic material that can be used to change the specific gravity of the fluid to obtain an actual constant specific gravity range of 1.0 to 3.0 SG depending on the application. The rising current separator/jig features a closed-loop fluid system in which the fluid is returned to the rising current separator/jig continuously instead of being disposed of/removed from the system. The rising current separator/jig features a stainless steel slotted screen with an opening of about 1.5 mm. The screen contains the material to form a bed while the fluid oscillates up and down through the screen. As the fluid oscillates up and down, the different settling velocities of the mixed waste streams will be generating layers of material concentrates. A nuclear density gauge measures the thickness of the bed to control the different density cuts that are to be generated through the rising current separator.

FIGS. 3A and 3B show an exemplary system 200 capable of recovering metals and glass from a waste stream. As can be seen, the system has multi-stage screen(s) 204, shredder(s) 206, rising current separator(s)/jig(s) 214, 216, dewatering screens, magnetic pulley(s) 220, eddy current separator(s) 224, and optical sorters 226.

In certain specific embodiments, a rising current separator can be equipment that will separate sand and other minerals based on particle size or specific gravity. The process is referred to as 'hindered settling'. When non-conglomerated particles are introduced into a body of water, each particle will have its own settling rate. In a static body of water, this would result in a stratified body of material when all particles came to rest. In a rising current separator, water is introduced and causes an upward rising current. This upward rising current captures finer particles and carries them over the weirs while the larger particles pass through the current and report to the pay-off valve. Some suitable examples include jig, pulsating jigs, and sand classifiers.

In one specific embodiment, the process contains essentially only those steps in FIGS. 1A, and 1B. In another embodiment, the process contains essentially only those steps in FIGS. 1A and 2. In yet another embodiment, the process contains essentially only the steps in FIGS. 3A and 3B. In such embodiments, additional features or steps increase the "footprint" of the process without improving the results.

In one specific embodiment, the entire process or system is a wet process or system. It was found that the water or fluid resulted in fewer dust particles, which has health benefits to those around the process or system. In some embodiments, there is always some water with the glass particles/glass recovery.

In one specific embodiment, the process or system can have a throughput 2-3 times higher than a typical dry plant having the same geographic footprint. Further, the system or process also has less moving elements or parts.

With regards to the waste stream, specific embodiments can be used to process waste materials or recyclable material that contains a concentration of glass larger than 15%, or 25%, 35%, 45%, and/or 50%. This means that as long as there is a good concentration of glass (as low as 15% or larger) the system can properly sort the materials. Household waste that has been presorted into "glass and non-glass" streams will be a good example. Typically household waste that is not landfilled can be presorted at a recycling facility where a glass concentrate will be generated. This glass concentrate is one example of a "good feed material." Municipal waste containing glass is an exemplary waste stream material.

It will be appreciated that the embodiments described herein are susceptible to modification, variation and change without departing from the spirit of the invention. Thus, the description above represents only selected embodiments and is, therefore, not to be considered limiting of scope, for the inventions may admit to other equally effective embodiments and applications.

What is claimed is:

1. A system for recovering desired materials from a mixed waste stream comprising:
    a waste stream having glass;
    a feeder configured to dispense the waste stream;
    a first wet separator with fluid or media operating at a specific density between about 1.6 SG to 2.4 SG and configured to separate the waste stream into a first portion and a second portion, wherein the waste stream is dispensed from the feeder and the first wet separator is a closed-loop fluid system, wherein the system is configured to recover glass from the waste stream; and
    a dewatering device configured to remove water from the second portion.

2. The system of claim 1, wherein the first wet separator is a pulsating jig.

3. The system of claim 1, wherein the first wet separator is a rising current separator.

4. The system of claim 1, further comprising a magnetic pully configured to remove ferrous metals from the second portion after the dewatering device.

5. The system of claim 4, further comprising an eddy current separator configured to remove additional metals from the second portion.

6. The system of claim 1, wherein the first wet separator is a first rising current separator that is configured to operate at a specific density between of about 2 SG.

7. The system of claim 3, wherein the feeder is a batch feeder configured to dispense the input waste stream onto a multi-stage screen.

8. The system of claim 4, further comprising a multi-stage screen having a first screen and second screen configured to separate materials within the waste stream by size.

9. The system of claim 4, further comprising an additional wet separator that is a rising separator or a jig operating at between 2.8 SG and 3.4 SG, wherein the additional wet separator is configured to receive the waste stream from the feeder and is further configured to separate the waste stream into heavier particles and lighter particles; and the first wet separator is configured to receive the lighter particles and further configured to separate the lighter particles into the first portion and the second portion.

10. The system of claim 1, further comprising a first screen configured to allow a first-sized materials and a second-sized materials to pass therethrough, wherein the second-sized materials are smaller than the first-sized materials; the second screen being configured to allow the second-sized materials to pass therethrough.

11. The system of claim 10, further comprising: a size reducer configured to receive the first-sized materials and further configured to reduce the first-sized materials into comminuted materials and small, third-sized materials.

12. The system of claim 4, wherein the first wet separator further comprises an oscillating fluid and a slotted screen, wherein the first wet separator is configured to separate the waste stream into first particles and second particles, wherein the first particles are heavier than the second particles.

13. The system of claim 1, wherein the input waste stream comprises municipal glass waste.

14. The system of claim 8, wherein the multi-stage screen comprises a rotating drum, a wet screen, a vibrating screen, or a combination thereof.

15. The system of claim 4, wherein the system is configured to recover up to 95% of the glass from the waste stream.

16. The system of claim 11, wherein: the first-sized materials are between about 100 millimeters and about 17 millimeters in size; the second-sized materials are about 17 millimeters or less; and the third-sized materials range from about 2 millimeters to about 6 millimeters in size.

17. The system of claim 1, wherein the first wet separator comprises a closed-loop fluid system, configured to recycle the fluid therein.

18. The system of claim 1, wherein the waste stream is greater than 50 percent glass concentrate.

19. The system of claim 9, wherein the additional wet separator further comprises an oscillating fluid with a specific gravity that is about 1.0 to about 3.5 times that of water.

20. The system of claim 19, wherein the additional wet separator is configured to operate at a specific density between about 3.2 specific gravity and the heavier particles comprise materials that are equal to or greater than 3.2 specific gravity.

21. The system of claim 1, wherein the first wet separator is configured to operate at about 2.0 specific gravity and the second portion comprises materials that are equal to or less than 2.0 specific gravity.

22. The system of claim 9, wherein the first wet separator, the additional wet separator, or both are jigs.

23. The system of claim 12, wherein the slotted screen comprises an opening of about 1.5 millimeters.

24. The system of claim 11, wherein: the first particles comprise ferrous metals, non-ferrous metals, precious metals, or a combination thereof; and the third particles comprise plastic, paper, food waste, or a combination thereof.

25. The system of claim 4, wherein: the magnetic pulley comprises a field strength that is greater than about 200 gauss.

26. A wet process for recovering glass from a mixed waste stream comprising:
providing a mixed waste stream having glass;
separating the waste stream using a first rising current separator with fluid or media operating at a specific density between 1.8 and 2.4 SG,
wherein there is a first heavy fraction and a first light fraction, and dewatering the first heavy fraction and the system is configured to recover up to 95% of the glass from the waste stream.

27. The process of claim 26, further comprising magnetically separating the first heavy fraction to recover ferromagnetic metals, and separating the first heavy fraction using an eddy current separator, wherein there is a second metallic fraction and a second non-metallic fraction, wherein the second non-metallic fraction comprises the glass.

28. The process of claim 26, further comprising comminuting scrap into a first residue by mechanical comminution; and sizing the first residue using a wet screen to collect a first material with a specific particle size.

29. The process of claim 28, wherein the comminuted materials are circulated back to the multi-stage screen after a first pass through the size reducer for further separation.

30. The process of claim 27, further comprising separating the second non-metallic fraction is separated into ceramics; and glass.

31. The process of claim 26, wherein: a creep feeder is configured to deliver the mixed waste stream to a magnetic pulley; the magnetic pulley receives the mixed waste stream from the creep feeder; the magnetic pulley separates ferrous metals from the mixed waste stream to produce a non-ferrous portion of the mixed waste stream; a high frequency eddy current separator that receives the non-ferrous portion of the waste stream and separates nonferrous metals from the non-ferrous portion of the waste stream to produce a purified waste stream; an additional rising current separator that receives the purified waste stream and separates any remaining metals from the purified waste stream to produce a non-metallic portion of the waste stream; the first rising current separator receives the non-metallic portion of the waste stream and separates the non-metallic portion of the waste stream into a light portion of the waste stream and a heavy portion of the waste stream; the heavy portion of the waste stream undergoes de-watering to form glass concentrate; and a plurality of optical sorters separate the glass concentrate into a glass portion and ceramic portion.

32. The method of claim 31, wherein the optical sorters further separate the glass concentrate into a waste portion and the waste portion is re-run through the optical sorters.

* * * * *